3,471,399
HYDRODESULFURIZATION CATALYST AND PROCESS FOR TREATING RESIDUAL FUEL OILS
Mark J. O'Hara, Prospect Heights, Ill., assignor to Universal Oil Products Company, Des Plaines, Ill., a corporation of Delaware
No Drawing. Filed June 9, 1967, Ser. No. 644,828
Int. Cl. C10g 23/04; B01j 11/40, 11/06
U.S. Cl. 208—216          10 Claims

ABSTRACT OF THE DISCLOSURE

An improved hydrodesulfurization catalyst is disclosed in which the improvement is attributed to particular physical characteristics of an alumina-silica catalyst relating to average pore volume, average pore diameter, surface area and apparent bulk density limitations. Residual fuel oils are desulfurized with the catalyst in which the alumina and silica are present in a weight ratio of 1.5:1 to 9:1 composited with a Group VI-B metal and a Group VIII metal.

BACKGROUND OF THE INVENTION

It has become well-known that oxides of sulfur, plus lesser amounts of other sulfurous compounds, are among the major pollutants of the atmosphere. It has been estimated that, in this country alone, in excess of about 23 million tons of sulfur dioxide has been discharged into the atmosphere on an annual basis. The increasingly deleterious effect of the sulfurous pollutants with respect to cardiorespiratory disease, eye irritation, and the like, has prompted rather severe legislative action to control the amount of sulfur dioxide discharged into the atmosphere, particularly in densely populated areas where the problem is more acute. It has been recognized that the combustion of petroleum products accounts for a substantial portion of said oxides of sulfur and legislation has been effected or proposed which is particularly directed to the limitation of sulfurous compounds in residual fuel oils to be burned in densely populated areas. The supply of residual fuel oils of suitably low sulfur content is entirely inadequate to meet present day requirements and it becomes increasingly important to develop improved desulfurization techniques to treat the more accessible and abundant residual fuel oils of relatively high sulfur content. Desulfurization technology is presently concerned with hydrotreating and to the development of catalysts that are more selective and/or operate at less severe conditions to obviate hydrocracking of the residual fuel oil.

Hydrotreating, or hydrodesulfurization, is generally effected at hydrodesulfurization reaction conditions including an imposed hydrogen pressure of from about 100 to about 1000 pounds per square inch (p.s.i.). Normally, the hydrogen is charged together with recycle hydrogen to provide from about 1000 to about 500 standard cubic feet per barrel (s.c.f./bbl.) of hydrocarbon charge. Hydrodesulfurization reaction conditions further include an elevated temperature, usually from about 200° F. to about 800° F. although temperatures in the higher range, say from about 600° F. to about 800° F., are most suitable. Also, the sulfur-containing feed stock is generally suitably processed at a liquid hourly space velocity (LHSV) of from about 1.0 to about 20. Hydrodesulfurization catalysts preferably comprise a Group VI-B metal, usually molybdenum, and a Group VIII metal, usually nickel, on a refractory inorganic oxide carrier material, usually a composite of alumina and silica.

Catalysis is a mechanism not always understood and in many instances unpredictable from the aspect of activity, selectivity, stability and the like. Minor variations in physical characteristics and/or composition may provide unexpected and substantial differences in efficiency or usefulness in connection with a particular conversion reaction. For example, it has been discovered that the aforementioned hydrodesulfurization catalyst, modified to comprise certain physical characteristics, the significance of which is neither disclosed nor apparent from prior art teachings, provides a substantially improved catalyst with respect to activity, selectivity and stability and uniquely adapted to the desulfurization of residual fuel oils.

It is then an object of the present invention to present an improved process for the hydrodesulfurization of residual fuel oils. It is a more specific object to present an improved catalyst particularly adapted to the hydrodesulfurization of residual fuel oils.

SUMMARY OF THE INVENTION

In one of its broad aspects, the present invention embodies a process for desulfurizing a sulfurous residual fuel oil which comprises treating said fuel oil at hydrodesulfurization reaction conditions in contact with the hereinafter described hydrodesulfurization catalyst, separating a normally gaseous material comprising sulfurous compounds and recovering a residual fuel oil product substantially free of sulfurous compounds, the aforesaid hydrodesulfurization catalyst comprising alumina and silica in a weight ratio of from about 1.5:1 to about 9:1 and having composited therewith a metal of Group VI-B and a metal of Group VIII, said catalyst being characterized by an average pore volume of from about 0.3 to about 0.5 cubic centimeter per gram, an average pore diameter of from about 60 to about 100 A., a surface area of from about 150 to about 250 square meters per gram and an apparent bulk density of from about 0.625 to about 0.875 gram per cubic centimeter.

Other objects and embodiments of this invention will become apparent in the following detailed specification.

The description "residual fuel oil" is intended to include the residuum produced by separating light fractions from crude petroleum, also known as asphaltum oil, liquid asphalt, black oil, petroleum tailings, residuum, residual reduced crude, and bunker fuel oil, typically having a distillation range in excess of about 650° F.

The hydrodesulfurization catalyst of this invention is characterized by an average pore volume of from about 0.3 to about 0.5 cubic centimeter per gram, an average pore diameter of from about 60 to about 100 angstroms, a surface area of from about 150 to about 250 square meters per gram, and an apparent bulk density of from about 0.625 to about 0.875 gram per cubic centimeter. Preferably, the catalyst comprises an average pore diameter of from about 70 to about 90 angstroms and an apparent bulk density of from about 0.65 to about 0.85 grams per cubic centimeter. The catalyst may be prepared to embody the desired physical properties in any conventional or otherwise convenient manner. One preferred method of preparation which affords a convenient means of developing the desired physical characteristics relates to the co-gelation of an alumina sol and a silica sol to form spherical gel particles utilizing the well-known oil drop method. Thus, an alumina sol, suitably prepared by digesting aluminum pellets in aqueous hydrochloric acid solution, is commingled with a silica sol, suitably prepared by the acidification of water glass as is commonly practiced, and the sol blend dispersed as droplets in a hot oil bath whereby gelation occurs with the formation of spheroidal particles. In this type of operation, the silica is set thermally, the alumina being set chemically utilizing ammonia as a neutralizing or setting agent. Usually the ammonia is furnished by an ammonia precursor which is included in the sol. The ammonia precursor is most often urea, hexamethylenetetramine or mixtures thereof, although other weakly basic materials which are substantially stable at normal temperatures but hydrolyzable to ammonia with increasing temperature may be employed. Only a fraction of the ammonia precursor is hydrolyzed or decomposed in the relatively short period which the initial gelation occurs. During the subsequent aging process, the residual precursor retained in the spheroidal gel particles continues to hydrolize and effect further polymerization of the alumina-silica whereby the pore characteristics of the material are established. The alumina-silica particles are aged, usually for a period of from about 10 to about 24 hours, at a predetermined temperature, usually from about 120 to about 220° F., and at a predetermined pH value. The aging time may be substantially reduced utilizing pressure aging techniques. However, with alumina-silica ratios in the higher range pressure aging tends toward lower apparent bulk densities.

As previously stated, the foregoing method affords a convenient means of developing the desired physical characteristics of the catalyst. The method includes a number of process variables which affect the physical properties of the alumina-silica composite and the catalyst subsequently prepared therefrom. However, it should be noted that a particular process variable will not necessarily be as effective to produce a desired result with one alumina-silica ratio as with another. Generally, the aluminum-chloride ratio of the alumina sol will influence the apparent bulk density of the alumina-silica product and, correspondingly, the pore volume and pore diameter characteristics attendant therewith, lower ratios tending toward higher apparent bulk densities. Other process variables effecting the physical properties of the catalyst include the time, temperature and pH at which the alumina-silica particles are aged. Usually temperatures in the lower range and shorter aging periods tend toward higher apparent bulk densities. Surface area properties are normally a function of calcination temperature, a temperature of from about 800° F. to about 1500° F. being suitably employed. Often, as will be apparent with reference to the appended examples, a slight variation in process conditions will produce the desired results. Thus, by commingling the neutralizing agent with the alumina sol prior to blending said sol with the silica sol, as opposed to commingling the neutralizing agent with a previously blended alumina-silica sol, the desired pore volume, pore diameter and apparent bulk density properties are obtained. Other methods of controlling the physical characteristics of the alumina-composite and the final catalyst composite will be apparent to those skilled in the art.

The catalyst of this invention comprises a metal of Group VI–B and the metal of Group VIII deposited on an alumina-silica composite. Thus, the catalyst may comprise chromium, molybdenum, and/or tungsten in combination with one or more metals of Group VIII i.e., iron, nickel, cobalt, platinum, palladium, ruthenium, rhodium, osmium and iridium. Of the Group VI–B metals molybdenum is preferred. The Group VI–B metal is suitably employed in an amount to comprise from about 5 to about 20 weight percent of the final catalyst composite. The Group VIII metal, which is preferably nickel, is suitably effective in amounts to comprise from about 0.1 to about 10 weight percent of the final catalyst composite. The optimum catalytic effect of the alumina-silica composite with respect to hydrodesulfurization, with minimal hydrocracking effect, is realized utilizing an alumina-silica composite comprising alumina and silica in a weight ratio of from about 1.5:1 to about 9:1, with a ratio of from about 3:1 to about 9:1 being preferred.

The alumina-silica composite utilized herein is considered to function as a catalytic element of the final catalyst composite as well as the carrier or support for the metallic components thereof to give a final catalyst composite of improved properties with respect to hydrodesulfurization as herein contemplated.

The Group VI–B and the Group VIII metal component can be composited with the alumina-silica composite in any suitable manner. For example, the particles can be soaked, dipped, suspended or otherwise immersed in a common solution comprising a suitable compound of a Group VI–B metal and a suitable Group VIII metal compound. Alternatively, the Group VI–B metal and the Group VIII metal may be composited with the alumina-silica utilizing individual solutions thereof and in any convenient sequence. Suitable compounds of Group VI–B metals include ammonium molybdate, ammonium paramolybdate, molybdic acid, molybdenum trioxide, ammonium chromate, ammonium peroxychromate, chromium acetate, chromous chloride, chromium nitrate, ammonium metatungstate, tungstic acid, etc. Compounds of metals of Group VIII which are suitable include nickel nitrate, nickel sulfate, nickel chloride, nickel bromide, nickel fluoride, nickel iodide, nickel acetate, nickel formate, cobaltous nitrate, cobaltous sulfate, cobaltous fluoride, ferric fluoride, ferric bromide, ferric nitrate, ferric sulfate, ferric formate, ferric acetate, platinum chloride, chloroplatinic acid, chloropalladic acid, palladium chloride; etc.

The final catalyst composite after all of the catalytic components are present therein, is usually dried for a period of from about 2 to about 8 hours or more in a steam drier, then at from about 212° F. to about 260° F. in a drying oven, and oxidized in an oxygen-containing atmosphere, such as air, at a temperature of from about 800° F. to about 1500° F. for a period of from about 1 to about 8 hours or more.

The following examples are presented in illustration of the catalyst and of the process of this invention and are not intended as an undue limitation on the generally broad scope of the invention as set out in the appended claims.

Example I

An aqueous water glass solution (139 cc.) comprising 18.5% $SiO_2$, was acidified with 88 cc. of a 50% hydrochloric acid solution to form the silica sol, the Cl/Na ratio thereof being about 1.8. An alumina sol (857 grams), comprising 122 grams of aluminum, was commingled with 7.1 cc. of concentrated hydrochloric acid to give a 1.3 Al/Cl ratio thereto, treated with ammonium hydroxide whereby 14% of the free chloride was neutralized, and thereafter blended with the aforesaid silica sol. The resulting sol blend was further mixed with 850 grams of an 18.4% aqueous hexamethylenetetramine solution—sufficient to effect 180% neutralization of the free chloride. The sol blend was thereafter dispersed as droplets into a hot (210° F.) oil bath and formed into spherical gel particles. The spheres were aged in the oil bath at said temperature for about 18 hours and further aged at said temperature for 4 hours in 2500 cc. of a 3% aqueous ammonia solution. The spheres were then washed with a total of about 19 liters of water containing 25 milliliters of a 28% ammonia solution and 15 milliliters of a 20% ammonium nitrate solution. The washed spheres were then dried at 212° F. for 3 hours and calcined at 1200° F. for 3 hours. The dried and calcined spheres were thereafter treated with an aqueous solution of molybdic acid and nickel nitrate in a rotary steam drier. The aqueous solution was prepared by commingling an aqueous solution of 38.5 grams of 85% molybdic acid and 23 milliliters of ammonium hydroxide with an aqueous solution of 13.5 grams of nickel nitrate hexahydrate and 12 milliliters of ammonium hydroxide, the resulting solution being diluted to 170 milliliters with water. 100 grams of the dried and calcined alumina-silica spheres (1/16″) were immersed in the impregnating solution which was then evaporated to dryness, with an additional hour of drying at 248° F. in a drying oven. The spheres were dried in air at 750° F. for 1 hour and calcined in air at 1100° F. for 1 hour. The catalyst thus prepared consisted of 2% nickel and 16% molybdenum on an alumina-silica carrier material comprising 88 weight percent alumina and 12 weight percent silica. The catalyst had an apparent bulk density of 0.615 gram per cubic centimeter, an average pore volume of 0.22 cubic centimeter per gram, an average port diameter of 100 angstroms, and a surface area of 88 square meters per gram.

150 cc. (92.25 grams) of the catalyst was placed in a fixed bed of a vertical tubular reactor. A residual reduced crude oil was charged to the reactor in a once-through type of operation at a LHSV of about 1.0 together with recycle hydrogen charged thereto at a rate of approximately 15,000 s.c.f./b.b.l. of hydrocarbon charge. The residual reduced crude oil charge stock had an initial boiling point of 631° F., a API of 12.0 at 60° F., a sulfur concentration of 3.77 weight percent and contained 6.75 weight percent of heptane insoluble asphaltenes. The charge stock was preheated, entering the catalyst bed at about 716° F. and exiting therefrom at about 797° F. The reactor charge traveled downflow through the catalyst bed at a hydrogen pressure of 3,000 p.s.i.g. the reactor effluent being recovered in a high pressure separator. Recycle hydrogen was recycled overhead from the separator, water-scrubbed and recycled. The hydrotreated residual reduced crude oil was recovered from the separator, charged to a stripper, and the stripped product recovered. After 35 hous on stream, the hydrotreated product analyzed 1.05 weight percent sulfur, 3.1 weight percent heptane insoluble asphaltenes, and had an API gravity at 60° F. of 19.4.

Example II

In this example, the catalyst was prepared to embody the physical characteristics found to be particularly effective in the removal of sulfur. In this instance, an aqueous water glass solution (139 cc.), comprising 18.5% $SiO_2$, was acidified with 88 milliliters of a 50% hydrochloric acid solution to form a silica sol, the Cl/Na ratio thereof being about 1.8. An alumina sol (857 grams), comprising 122 grams of aluminum, was commingled with 7.1 cc. of concentrated hydrochloric acid to give a 1.3 Al/Cl ratio thereto. The alumina sol was further mixed with 850 grams of an 18.4% concentration of hexamethylenetetramine in aqueous solution—sufficient to effect 180% neutralization of the free chloride. The alumina sol was thereafter blended with the silica sol and the sol blend was further treated in substantially the same manner as disclosed in the previous example. The catalyst thus prepared consisted of 2% nickel and 16% molybdenum on an alumina-silica carrier material comprising 88 weight percent alumina and 12% silica. The catalyst had an apparent bulk density of 0.70 grams per cubic centimeter, an average pore volume of 0.39 cubic centimeter per gram, an average pore diameter of 73 angstroms, and a surface area of 214 square meters per gram.

150 cc. (105.6 grams) of the catalyst was placed in a fixed bed of a vertical tubular reactor and the residual reduced crude oil of Example I was processed over the catalyst at the conditions therein described. After 35 hours on stream, the hydrotreated product analyzed 0.28 weight percent sulfur, 4.30 weight percent heptane insoluble asphaltenes, and had an API gravity of 22.7 at 60° F.

Example III

A third catalyst was prepared consisting of 2% nickel and 16% molybdenum on an alumina-silica carrier material comprising 88 weight percent alumina and 12 weight percent silica. The catalyst was distinguished from the previous catalysts in that it had an apparent bulk density of 1.05 grams per cubic centimeter, an average pore volume of 0.26 cc. per gram, an average pore diameter of 51 angstroms and a surface area of 206 square meters per gram. When utilized to treat the residual reduced crude oil previously described and at the described conditions, the sulfur conversion was only 68% with little if any conversion of the heptane insoluble asphaltenes. The API gravity of the hydrotreated product was 20.0 at 60° F.

It is apparent that the catalyst prepared to embody the physical properties of this invention effects a significant improvement in sulfur conversion. In the cases illustrated, the improvement is the difference between a 68.0% and a 72.2% sulfur conversion obtained with catalysts differing from the catalysts of this invention only with respect to physical properties, and a 92.6% conversion utilizing the catalyst of this invention.

I claim as my invention:

1. A hydrodesulfurization catalyst comprising alumina composited with silica in a weight ratio of from about 1.5:1 to about 9:1 and having composited therewith a metal of Group VI–B and a metal of Group VIII, said catalyst being characterized by an average pore volume of from about 0.3 to about 0.5 cubic centimeter per gram, an average pore diameter of from about 70 to about 90 angstroms, a surface area of from about 150 to about 250 square meters per gram and an apparent bulk density of from about 0.625 to about 0.875 gram per cubic centimeter.

2. The hydrodesulfurization catalyst of claim 1 further characterized in that said Group VI–B metal is molybdenum and said Group VIII metal is nickel.

3. The hydrodesulfurization catalyst of claim 2 further characterized in that said molybdenum comprises from about 5 weight percent to about 20 weight percent of the final catalyst composite, and said nickel comprises from about 0.1 weight percent to about 10 weight percent thereof.

4. The hydrodesulfurization catalyst of claim 3 further characterized in that said alumina is composited with said silica in a weight ratio of from about 3:1 to about 9:1.

5. The hydrodesulfurization catalyst of claim 4 further characterized in that said apparent bulk density is from about 0.65 to about 0.85 gram per cubic centimeter.

6. A process for desulfurizing a sulfurous residual fuel oil which comprises treating said fuel oil at hydrodesulfurization conditions in contact with the hereinafter described desulfurization catalyst, separating a normally gaseous material comprising sulfurous compounds and recovering a residual fuel oil product substantially free of sulfurous compounds, the aforesaid hydrodesulfurization catalyst comprising alumina and silica in a weight ratio of from about 1.5:1 to about 9:1 and having composited therewith a metal of Group VI–B and a metal of Group VIII, said catalyst being characterized by an average pore volume of about 0.3 to about 0.5 cubic centimeter per gram, an average pore diameter of from about 70 to about 90 angstroms, a surface area of from about 150 to about 250 square meters per gram and an apparent bulk density of from about 0.625 to about 0.875 gram per cubic centimeter.

7. The process of claim 6 further characterized in that the Group VI–B metal of the catalyst is molybdenum and the Group VIII metal is nickel.

8. The process of claim 7 further characterized in that said molybdenum comprises from about 5 weight percent to about 20 weight percent of the final catalyst composite, and said nickel comprises from about 0.1 weight percent to about 10 weight percent thereof.

9. The process of claim 8 further characterized in that said apparent bulk density is from about 0.65 to about 0.85 gram per cubic centimeter.

10. The process of claim 9 further characterized in that the alumina-silica weight ratio of said catalyst is from about 3:1 to about 9:1.

References Cited

UNITED STATES PATENTS

| | | | |
|---|---|---|---|
| 3,252,889 | 5/1966 | Capell et al. | 252—455 |
| 3,345,286 | 10/1967 | Kovach et al. | 208—216 |
| 3,383,305 | 5/1968 | Rogers et al. | 208—216 |
| 3,169,918 | 2/1965 | Gleim | 208—216 |
| 3,383,301 | 5/1968 | Beuther et al. | 208—217 |
| 3,393,148 | 6/1968 | Bertolacini et al. | 208—216 |

DELBERT E. GANTZ, Primary Examiner

G. J. CRASANAKIS, Assistant Examiner

U.S. Cl. X.R.

252—455, 458